(12) United States Patent
Di Fabbrizio et al.

(10) Patent No.: US 11,461,420 B2
(45) Date of Patent: *Oct. 4, 2022

(54) REFERRING EXPRESSION GENERATION

(71) Applicant: Vui, Inc., Boston, MA (US)

(72) Inventors: Giuseppe Di Fabbrizio, Brookline, MA (US); Evgeny Stepanov, Povo (IT); Shardul Naithani, Malden, MA (US); Purvank Dhimantkumar Patel, Malden, MA (US); Phil C. Frank, Cohasset, MA (US)

(73) Assignee: Vui, Inc., Boston, MA (US)

( * ) Notice: Subject to any disclaimer, the term of this patent is extended or adjusted under 35 U.S.C. 154(b) by 167 days.

This patent is subject to a terminal disclaimer.

(21) Appl. No.: 17/067,019

(22) Filed: Oct. 9, 2020

(65) Prior Publication Data

US 2021/0157870 A1    May 27, 2021

Related U.S. Application Data

(63) Continuation of application No. 16/696,598, filed on Nov. 26, 2019, now Pat. No. 10,839,033.

(51) Int. Cl.
| | |
|---|---|
| *G06F 16/00* | (2019.01) |
| *G06F 16/9535* | (2019.01) |
| *G06N 3/04* | (2006.01) |
| *G06F 16/9532* | (2019.01) |
| *G06F 40/247* | (2020.01) |
| *G06F 40/30* | (2020.01) |
| *G06F 40/295* | (2020.01) |
| *G06F 16/9032* | (2019.01) |

(52) U.S. Cl.
CPC .... *G06F 16/9535* (2019.01); *G06F 16/90332* (2019.01); *G06F 16/9532* (2019.01); *G06F 40/247* (2020.01); *G06F 40/295* (2020.01); *G06F 40/30* (2020.01); *G06N 3/049* (2013.01)

(58) Field of Classification Search
CPC .......... G06F 16/9535; G06F 16/90332; G06F 16/9532; G06F 40/247; G06F 40/295; G06F 40/30; G06F 16/36; G06N 3/049; G06N 3/0445; G06N 3/0454; G06N 3/08
See application file for complete search history.

(56) References Cited

U.S. PATENT DOCUMENTS

| 8,595,228 B1 * | 11/2013 | Horling ............... G06F 16/9535 707/733 |
| 8,768,934 B2 | 7/2014 | Jones et al. |
| 9,626,361 B2 * | 4/2017 | Greenwood ........ G06F 16/9535 |
| 10,418,032 B1 * | 9/2019 | Mohajer ............. G10L 15/1815 |

(Continued)

*Primary Examiner* — Noosha Arjomandi

(74) *Attorney, Agent, or Firm* — Mintz Levin Cohn Ferris Glovsky and Popeo, P.C.

(57) ABSTRACT

A method includes receiving data characterizing historical user interaction with a search engine associated with a plurality of items, the received data including a first search query and a first item name selected by a user in response to receiving a result of a search of the first search query; training, using the received data, a model that maps item names to referring expressions, the training including using the first item name selected by the user as an input to the model and the first search query as a supervisory signal to the model; and providing the model. Related apparatus, systems, techniques, and articles are also described.

17 Claims, 3 Drawing Sheets

(56) References Cited

U.S. PATENT DOCUMENTS

| | | | |
|---|---|---|---|
| 10,515,155 B2* | 12/2019 | Bachrach | G06N 5/02 |
| 10,839,033 B1 | 11/2020 | Fabbrizio et al. | |
| 2011/0307496 A1 | 12/2011 | Jones et al. | |
| 2012/0215640 A1* | 8/2012 | Ramer | G06F 16/9535 |
| | | | 705/14.55 |
| 2013/0144818 A1* | 6/2013 | Jebara | G06Q 50/00 |
| | | | 706/12 |
| 2014/0122384 A1* | 5/2014 | Champion | G09B 29/00 |
| | | | 706/12 |
| 2015/0324434 A1* | 11/2015 | Greenwood | G06F 16/9535 |
| | | | 707/722 |
| 2016/0103923 A1* | 4/2016 | Thomas | G06F 16/9535 |
| | | | 715/234 |
| 2016/0364757 A1* | 12/2016 | Zhang | G06Q 30/0269 |
| 2017/0031914 A1* | 2/2017 | de Mars | G06F 16/248 |
| 2017/0124071 A1* | 5/2017 | Huang | G06F 40/51 |
| 2017/0127016 A1 | 5/2017 | Yu et al. | |
| 2017/0236148 A1* | 8/2017 | James | G06F 16/335 |
| | | | 705/14.45 |
| 2017/0351781 A1* | 12/2017 | Alexander | G06N 3/08 |
| 2018/0121429 A1* | 5/2018 | Agrawal | G06F 16/3326 |
| 2018/0129941 A1 | 5/2018 | Gustafson et al. | |
| 2018/0129959 A1 | 5/2018 | Gustafson et al. | |
| 2018/0158037 A1* | 6/2018 | Cassel | G06F 21/552 |
| 2018/0218285 A1* | 8/2018 | Oliner | G06N 5/04 |
| 2018/0247221 A1 | 8/2018 | Park et al. | |
| 2018/0268318 A1* | 9/2018 | Matam | G06F 40/216 |
| 2018/0300407 A1* | 10/2018 | Wolny | G06N 20/00 |
| 2019/0102802 A1* | 4/2019 | Tuschman | G06Q 30/0204 |
| 2019/0121801 A1 | 4/2019 | Jethwa et al. | |
| 2019/0130904 A1* | 5/2019 | Homma | G10L 15/18 |
| 2019/0205384 A1* | 7/2019 | Zhu | G06F 40/30 |
| 2019/0205445 A1* | 7/2019 | Yazdani | G06F 16/252 |
| 2019/0251165 A1* | 8/2019 | Bachrach | G06N 3/084 |
| 2019/0294881 A1* | 9/2019 | Polak | G06V 20/52 |
| 2019/0349213 A1 | 11/2019 | Shive et al. | |

* cited by examiner

REFERRING EXPRESSION GENERATION

CROSS-REFERENCE TO RELATED APPLICATION

This application is a continuation of and claims the benefit under 35 U.S.C. § 120 to U.S. application Ser. No. 16/696,598 filed Nov. 26, 2019, currently allowed, the contents of which is hereby incorporated by reference in its entirety.

BACKGROUND

Conversational systems can interact with users to accomplish a query or task. Conversational systems exchange information with the user in a series of steps forming a dialog between a conversational agent of the system and the user. Information supplied by the user during the dialog can be processed and results can be generated to aid the user in accomplishing the query or objective within the same dialog or different users who may be performing similar or different queries via the conversational system.

Conversational systems include predictive models to generate the dialog responses and query results. The predictive models can learn from data samples and can respond to unforeseen interactions. Large amounts of annotated data are necessary to train models to reach robust conversational performance in user dialogs. Interaction data can also be used to train models, however interaction data may not be available when a conversational system is initially deployed.

SUMMARY

In an aspect, a method includes receiving data characterizing historical user interaction with a search engine associated with a plurality of items, the received data including a first search query and a first item name selected by a user in response to receiving a result of a search of the first search query; training, using the received data, a model that maps item names to referring expressions, the training including using the first item name selected by the user as an input to the model and the first search query as a supervisory signal to the model; and providing the model.

One or more of the following features can be included in any feasible combination. For example, data characterizing historical user interaction can include\clickstream data, click path data, and/or web log data. The received data can further characterize item descriptions, reviews, and/or purchase history. The method can include determining, using the model, a set of semantically equivalent expressions for the first item name. The method can include adding the set of semantically equivalent expressions to a lexicon associated with a first tenant and used by a dialog manager. Determining the set of semantically equivalent expressions for the first item name can include using a sequence-to-sequence recurrent neural network (RNN) to perform at least part of the determining. The first item name can be an input vector into an encoder of the RNN and a semantically equivalent expression can be an output of a decoder of the RNN. The referring expressions can include item synonyms, colloquial expressions, and/or generic descriptions corresponding to the first item name. The data characterizing historical user interaction can characterize a relevancy between search queries and item names. The model can include a neural language model; a recurrent neural network (RNN) including an encoder and a decoder; a feed-forward neural network based language model; and/or a recurrent neural network based language model. The providing can include using the model to determine, from an input referring expression provided as part of a second search query, the first item name. The providing can include storing, displaying, processing, and/or transmitting the model.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

DESCRIPTION OF DRAWINGS

These and other features will be more readily understood from the following detailed description taken in conjunction with the accompanying drawings, in which.

Figure 1:
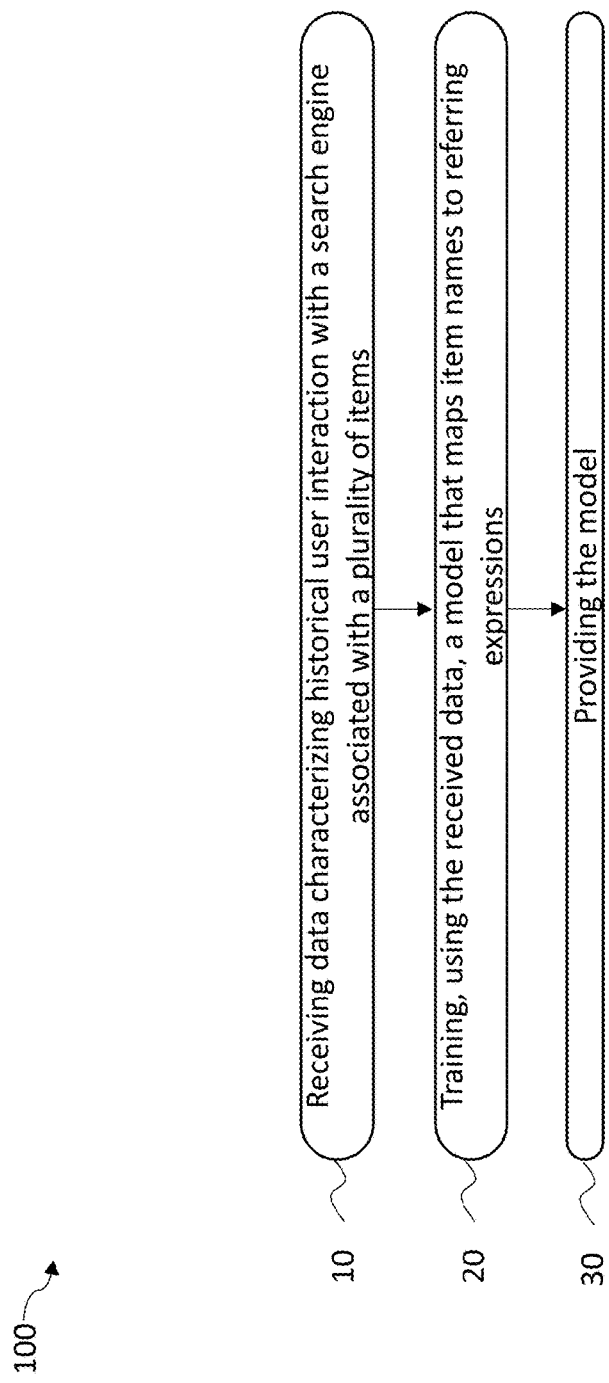
FIG. 1 illustrates an example process for providing a model for use in an example conversational system in which the model is trained to associate item names and referring expressions.

It is noted that the drawings are not necessarily to scale. The drawings are intended to depict only typical aspects of the subject matter disclosed herein, and therefore should not be considered as limiting the scope of the disclosure.

DETAILED DESCRIPTION

A goal of conversational systems can be to provide high dialog quality and robust query resolution. Conversational system performance can depend on the predictive model used and how the predictive model was trained. Newly instantiated or recently deployed conversational systems may include predictive models that have not been sufficiently configured or trained to generate query results satisfactorily. For example, a user may provide a textual or audible search query to a conversational system in regard to a specific item. The query can include a sequence of words forming an input string to a predictive model. The ability of the predictive model to generate an output appropriately corresponding to the input string can be limited if the model was not trained with synonyms, referring expressions, related term, and/or corresponding contextually relevant descriptors of the item. Quickly and efficiently configuring conversational systems, which can include training the predictive models operable therein, can be important to provide users with highly relevant search and/or dialog results. In addition, conversational system operators seek to minimize implementation times for faster system deployment by bootstrapping or preconfiguring the conversational systems with predictive models that have been sufficiently trained to generate outputs that are contextually relevant and accurate for a wide range of query inputs, which may include referring expressions, synonyms, and/or previously unprocessed sequences of words.

But when implementing a new conversational system there may be limited training data available. In order to sufficiently train a predictive model, a large amount of hand annotated training data may be required, which can be infeasible and/or expensive to create. Accordingly, some implementations of the current subject matter can utilize historical interaction data associated with how users interact with a search engine that is associated with a plurality of items to automatically train a predictive model to map item names to referring expressions provided by a user in a search query. The referring expressions can be determined from item names, description, and reviews, as well as survey results, and the like. The referring expressions can also be determined from previous search queries and search results selected by a user, web log data, clickstream data, click path data, web site navigation data, and the like. This data can be used as a proxy value to estimate the relevance of a query result (e.g., an item) in terms of a query input (e.g., a synonym or expression referring to the item).

By training predictive models that map item names to referring expressions using historical user interaction with a search engine, which can be readily available in many contexts such as via click stream logs, the current subject matter can enable rapid implementation and deployment of conversational systems that have sufficiently trained models and thus high performance. And by using user interaction data that is readily available, the conversational systems can generate highly relevant query results in response to broad, less specific query inputs. This can enable a conversation system to automatically learn domain specific contextual associations between query inputs and target results without requiring specialized or predefined data sets as model training data. And some implementations of the current subject matter can enable rapid system deployment without extensive domain specific training or pre-configuration of the conversational model. Thus, in some implementations, a conversational system can provide faster user engagement and provide improved interfaces for conversational systems and/or search engines.

Before the conversational system can be deployed, the model can be trained with sufficient data to generate item names in response to referring expressions provided by a user. The dialog quality and performance of the conversational system depends on the robustness of the model configured therein and the training data used to teach the model to respond effectively. FIG. 1 is a process flow diagram illustrating an example process 100 of training a model that maps item names and referring expressions according to some example implementations in which data characterizing historical use interaction with a search engine is utilized as training data, which can enable rapid system deployment where there is limited existing training data.

At 10, data can be received characterizing historical user interaction with a search engine associated with a plurality of items. The historical user interaction can include a search query input by a user and the name of an item selected by a user in response to receiving results conducted according to the search query. For example, previously the search query can have been input by a user as a text string such as "angle bracket." The search engine can have previously performed a search and returned a list of results to the user. The user can have previously selected the most relevant result. For example, where the search query is "angle bracket", the name selected by the user can be "Simpson Strong-tie 12-Gauge Angle." Thus in this example, the data characterizing the historical user interaction can include the text string "angle bracket" as the search query and the text string "Simpson Strong-tie 12-Gauge Angle" as the item name.

The historical user interaction data can be commonly found in one or more readily available sources. For example, the historical user interaction data can include clickstream data, click path data, and/or web log data associated with a web site where the item can be provided, such as an e-commerce website. In some implementations, the data can include item descriptions, item reviews, as well as purchasing, billing, and/or search query data associated with the item. In some implementations, the data can characterize a relevancy between search queries and item names. The search queries can have been provided to a search engine or conversational system and can include various expressions referring to the item, as well as the item names.

At 20, a model can be trained using the received data. The model can map item names to referring expressions. For example, the training can include using the item name selected by the user (e.g., "Simpson Strong-tie 12-Gauge Angle") as an input to the model and the search query (e.g., "angle bracket") as a supervisory signal. By utilizing the search query (from the data characterizing the historical user interaction) as the supervisory signal and the selected item name as input, the model will be trained to map item names to referring expressions. Moreover, the data characterizing the historical user interaction data can be readily available from many commonly available sources and in quantities sufficient to train a relatively high performance model for a given contextual domain.

The referring expressions can include, for example, synonyms, colloquial or common expressions, and/or generic descriptions of the item and/or the item name. For example, an item name can be a precise sequence of words such as "Simpson Strong-tie 12-Gauge Angle" but may be commonly referred to by users in a search query as "angle bracket". The training can include using the item name of an item selected by a user from a list of search query results and providing the selected item name as an input to the model.

In some implementations, training the model can include determining additional items not within the plurality of items for which the search engine was originally trained to generate results for. For example, a product title can be converted into referring expressions that are closer to the colloquial language people use to refer to products. This can be conceptualized as a machine translation problem where the typically long and formal product name is translated in one or more simpler forms where the words of the simpler forms are either a subset of the words in the title or a combination of these words and synonyms of some of the words in the title. Based on this conceptualization, sequence to sequence (seq2seq) learning is one example approach to automatically capturing the relationship between the sequence of input words (e.g., product title) and the sequence of output words (e.g., referring expressions). As another example conceptualization, this approach can be seen to be reversing a search product problem, which is given a product, how people will actually search for it.

Given some mapping training examples such as the ones that can be automatically derived by a clickstream (e.g., search query associated to product clicked), Seq2seq learning can capture both the word mappings (words that are typically preserved into the targeted referring expression and their targeted order) and the words replacement that would preserve the meaning based on synonyms substitutions. Specifically, in some implementations, synonym replacements can be inferred by using transfer learning with embeddings trained on domain data such product descriptions or reviews. In some implementations, constraints can be imposed to enforce semantic similarity between the two mappings by jointly minimizing the categorical cross entropy error and the hinge loss between the product title and the user query vector embeddings. Both losses can be given equal weights. Additional context can be injected using product attributes as features.

While one example implementation is described using seq2seq, in some implementations, other machine translation methods can be used for mapping titles to queries.

In some implementations, the model can include a recurrent neural network (RNN) including an encoder and a decoder. Other examples may include more traditional machine translation methods or generative models based on neural language models (NLM) such as feed-forward neural network based LM or recurrent neural network based language model (RNNLM). One example approach to training a RNN model to map item names to referring expressions is described in more detail below with reference to FIG. 2.

At 30, the model can be provided. In some implementations, the model can be implemented in a natural language understanding module of a natural language agent ensemble of the conversational system. In some implementations, the model can be used to determine an item name from a referring expression provided as a part of a query of the item or a subsequent query of the item.

In some implementations, the model can be used to determine semantically equivalent referring expressions for items names. The set of semantically equivalent expression can be added to a lexicon associated with a tenant. The tenant can be, for example, a business owner deploying a conversational system via a web site for use in processing search queries or customer service requests. In some implementations, the conversational system can also include a natural language agent ensemble consisting of natural language processing resources, such as a dialog manager module. The lexicon can be used by the dialog manager to generate dialog outputs which can be associated with the item. An example conversational system capable of supporting multiple tenants and including an example dialogue manager is described in more detail below with reference to FIG. 3.

In some implementations, providing the model can include using the model to determine an item name from a referring expression. This may be performed, for example, as part of a natural language agent ensemble, such as by a dialog manager module. In some implementations, the model can be stored, displayed, processed, and/or transmitted.

In some implementations, once the model has been trained, the model can generalize items which may not be in the original training data and can generate sequences of words that are semantically equivalent referring expressions for an item. For example, in some implementations, the model can include an encoder-decoder recurrent neural network (RNN). The RNN model can include a sequence-to-sequence predictive model trained to generate semantically equivalent referring expressions for items. The sequence-to-sequence predictive model can utilize an encoder to process item names and a decoder to process referring expressions. The vectors generated by the encoder and the decoder can be hidden layer outputs generate by the model respectively over time. This provides the benefit of enhanced contextual relevancy between item names and referring expressions that can be utilized to configure conversational system with conversational models capable of responding accurately to unseen expressions referring to an item which can be provided by a user in a search query or other dialog input.

In some example implementations, generalization can be achieved by training a seq2seq model to avoid over-fitting (e.g., where the model is too complex, and it only performs well on training data) and under-fitting (e.g., the model is too simple, and performance is bad on both test and training data). For instances of under-fitting, it can be necessary to either increase the size of the training data set or oversample the training data. For instances of over fitting, L1 or L2 regularization will increase the model robustness and generalization. For example, regularization in RNN can be achieved by randomly dropping out deep neural network nodes in the dense layers.

Figure 2:
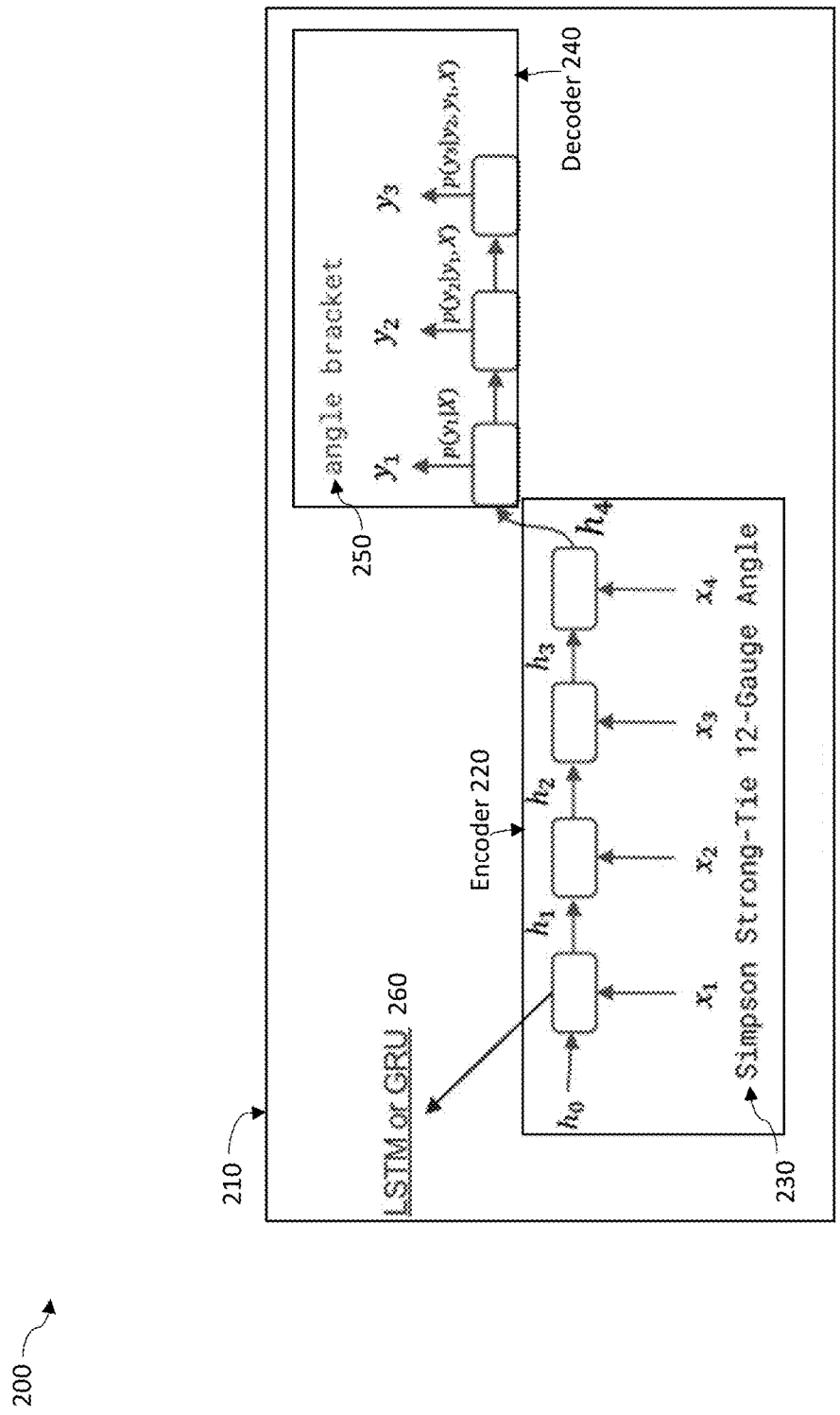
FIG. 2 illustrates an example encoder-decoder architecture for an example model.

FIG. 2 illustrates an example encoder-decoder architecture 200 for an example model 210 provided according to the example method 100 of FIG. 1. The model 210 can be configured as a sequence-to-sequence model using a RNN architecture which can include an encoder 220 and a decoder 240. A RNN is a class of artificial neural networks where connections between nodes form a directed graph along a temporal sequence. This allows it to exhibit temporal dynamic behavior. Unlike feedforward neural networks, RNNs can use their internal state (memory) to process sequences of inputs. Recurrent networks can have additional stored state, and the storage can be under direct control by the neural network. The storage can also be replaced by another network or graph, if that incorporates time delays or has feedback loops. Such controlled states are referred to as gated state or gated memory, and are part of long short-term memory networks (LSTMs) and gated recurrent units (GRU).

The model 210 can be configured to impose additional constraint on semantic similarity between item names, such as item name 230 "Simpson Strong-Tie 12-Gauge Angle" and a referring expression 250, which can be provided as a search query, such as "angle bracket". The model 210 can be configured to generate the referring expressions 250 by jointly minimizing the categorical cross entropy error and hinge loss between the item name vector and the referring expression vector. The hinge loss for the item name vector and the hinge loss for the referring expression vector can be given equal weights. The loss can be determined based on equation 1 shown below.

$$L=\max\{0, M-\cosine(q,a+)+\cosine(q,a-)\} \quad (1)$$

As shown in equation 1, M can be a margin, such as 0.05 and q can be the item name vector. a+ can be the correct referring expression that positively matches the item name. a− can be the vector for a user query belonging to some other item name. This vector can only be required during model training and can be selected randomly for each observation.

As illustrated in FIG. 2, x vector ($x_1$, $x_2$, $x_3$, $x_4$) is the encoder 220 input (where X_i represent the word embeddings vector for the word I in the input sequence), which corresponds to the item name (e.g., "Simpson Strong-Tie 12-Gauge Angle"), h is the encoder 220 output (h_t is the RNN hidden state function at timestep t which can be computed based on the previous input the configuration of the RNN cell (either LSTM or GRU)), p and y vector ($y_1$, $y_2$, $y_3$) relate to the decoder 240 output, which corresponds to the referring expression (e.g., "angle bracket"). The encoder 220 network produces a representation of the input sequence which is pushed forward to the decoder 240 network where at each step, an output y_i is generated based on the conditional probability p that maximizes the likelihood of generating y_i based on the previous input X and y_i−1, y_i−2, etc. In some example implementations, the encoder 220 input (the x vector) can include 300 element dense vectors precomputed through a very large model, which can be trained on general English or specific domain documents such as product descriptions and reviews. An LSTM and/or GRU 260 can also be included, which can interface with encoder 220.

Figure 3:
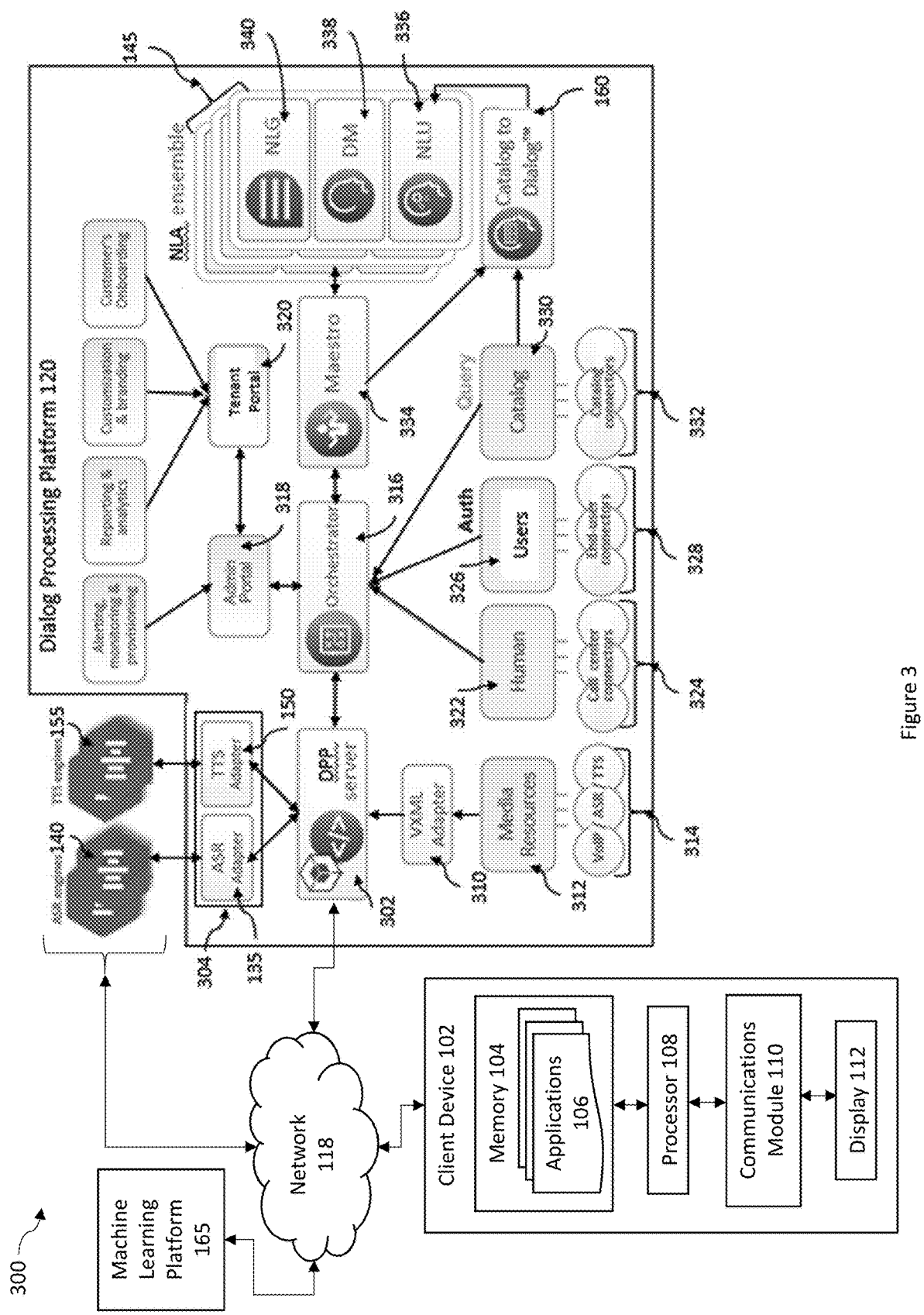
FIG. 3 is a system block diagram of an example conversational system according to some implementations of the current subject matter.

FIG. 3 illustrates an example conversational system 300. The conversational system 300 can include a client device 102, a dialog processing platform 120, and a machine learning platform 165. The client device 102, the dialog processing platform 120, and the machine learning platform 165 can be communicatively coupled via a network, such as network 118. In broad terms, a user can provide a query input including one or more referring expressions to the client device 102. The client device 102 can include a frontend of the conversational system 300. A conversational agent can be configured on the client device 102 as one or more applications 106. The conversational agent can transmit data associated with the query to a backend of the conversational system 300. The dialog processing platform 120 can be configured as the backend of the conversational system 300 and can receive the data from the client device 102 via the network 118. The dialog processing platform 120 can process the transmitted data to generate a response to the user query, such as an item name, and can provide the generated response to the client device 102. The client device 102 can then output the query response. A user may iteratively provide inputs and receive outputs via the conversational system 100 in a dialog. The dialog can include natural language units, such as words, which can be processed and generated in the context of a lexicon that is associated with the domain for which the conversational system 300 has been implemented.

As shown in FIG. 3, the conversational system 300 includes a client device 102. The client device 102 can include a large-format computing device or any other fully functional computing device, such as a desktop computers or laptop computers, which can transmit user data to the dialog processing platform 120. Additionally, or alternatively, other computing devices, such as a small-format computing devices 102 can also transmit user data to the dialog processing platform 120. Small-format computing devices 102 can include a tablet, smartphone, intelligent or virtual digital assistant, or any other computing device configured to receive user inputs as voice and/or textual inputs and provide responses to the user as voice and/or textual outputs.

The client device 102 includes a memory 104, a processor 108, a communications module 110, and a display 112. The memory 104 can store computer-readable instructions and/or data associated with processing multi-modal user data via a frontend and backend of the conversational system 300. For example, the memory 104 can include one or more applications 106 implementing a conversational agent application. The applications 106 can provide speech and textual conversational agent modalities to the client device 102 thereby configuring the client device 102 as a digital or telephony endpoint device. The processor 108 operates to execute the computer-readable instructions and/or data stored in memory 104 and to transmit the computer-readable instructions and/or data via the communications module 110. The communications module 110 transmits the computer-readable instructions and/or user data stored on or received by the client device 102 via network 118. The network 118 connects the client device 102 to the dialog processing platform 120. The network 118 can also be configured to connect the machine learning platform 165 to the dialog processing platform 120. The network 118 can include, for example, any one or more of a personal area network (PAN), a local area network (LAN), a campus area network (CAN), a metropolitan area network (MAN), a wide area network (WAN), a broadband network (BBN), the Internet, and the like. Further, the network 118 can include, but is not limited to, any one or more of the following network topologies, including a bus network, a star network, a ring network, a mesh network, a star-bus network, tree or hierarchical network, and the like. The client device 102 also includes a display 112. In some implementations, the display 112 can be configured within or on the client device 102. In other implementations, the display 112 can be external to the client device 102. The client device 102 can also include an input device, such as a microphone to receive voice inputs, or a keyboard, to receive textual inputs. The client device 102 can also include an output device, such as a speaker or a display.

The client device 102 can include a conversational agent frontend, e.g., one or more of applications 106, which can receive inputs associated with a user query and to provide responses to the users query. For example, as shown in FIG. 1, the client device 102 can receive user queries which are uttered, spoken, or otherwise verbalized and received by an input device, such as a microphone. In some implementations, the input device can be a keyboard and the user can provide query data as a textual input, in addition to or separately from the inputs provided using a voice-based modality. The applications 106 can include easily installed, pre-packaged software developer kits for which implement conversational agent frontend functionality on a client device 102. The applications 106 can include APIs as JavaScript libraries received from the dialog processing platform 120 and incorporated into a website of the entity or tenant to enable support for text and/or voice modalities via a customizable user interfaces. The applications 106 can implement client APIs on different client devices 102 and web browsers in order to provide responsive multi-modal interactive user interfaces that are customized for the entity or tenant. The GUI and applications 106 can be provided based on a profile associated with the tenant or entity. In this way, the conversational system 300 can provide customizable branded assets defining the look and feel of a user interface, different voices utilized by the text-to-speech synthesis engines 140, as well as textual responses generated by the NLA ensembles 145 which are specific to the tenant or entity.

As shown in FIG. 3, the conversational system 300 also includes a dialog processing platform 120. The dialog processing platform 120 operates to receive dialog data, such as user queries provided to the client device 102, and to process the dialog data to generate responses to the user provided dialog data. The dialog processing platform 120 can be configured on any device having an appropriate processor, memory, and communications capability for hosting the dialog processing platform as will be described herein. In certain aspects, the dialog processing platform can be configured as one or more servers, which can be located on-premises of an entity deploying the conversational system 300, or can be located remotely from the entity. In some implementations, the distributed processing platform 120 can be implemented as a distributed architecture or a cloud computing architecture. In some implementations, one or more of the components or functionality included in the dialog processing platform 120 can be configured in a microservices architecture, for example in a cloud computing environment. In this way, the conversational system 300 can be configured as a robustly scalable architecture that can be provisioned based on resource allocation demands. In some implementations, one or more components of the dialog processing platform 120 can be provided via a cloud computing server of an infrastructure-as-a-service (IaaS) and be able to support a platform-as-a-service (PaaS) and software-as-a-service (SaaS) services.

The dialog processing platform 120 can also include a communications module to receive the computer-readable instructions and/or user data transmitted via network 118. The dialog processing platform 120 also can also include one or more processors configured to execute instructions that when executed cause the processors to perform natural language processing on the received dialog data and to generate contextually specific responses to the user dialog inputs using one or more interchangeable and configurable natural language processing resources. The dialog processing platform 120 can also include a memory configured to store the computer-readable instructions and/or user data associated with processing user dialog data and generating dialog responses. The memory can store a plurality of profiles associated with each tenant or entity. The profile can configure one or more processing components of the dialog processing platform 120 with respect to the entity or tenant for which the conversational system 300 has been configured.

The dialog processing platform 120 can serve as a backend of the conversational system 300. One or more components included in the dialog processing platform 120 shown in FIG. 3 can be configured on a single server device or on multiple server devices. One or more of the components of the dialog processing platform 120 can also be configured as a microservice, for example in a cloud computing environment. In this way, the conversational system 300 can be configured as a robustly scalable architecture that can be provisioned based on resource allocation demands.

The dialog processing platform 120 includes run-time components that are responsible for processing incoming speech or text inputs, determining the meaning in the context of a dialog and a tenant lexicon, and generate replies to the user which are provided as speech and/or text. Additionally, the dialog processing platform 120 provides a multi-tenant portal where both administrators and tenants can customize, manage, and monitor platform resources, and can generate run-time reports and analytic data. The dialog processing platform 120 interfaces with a number of natural language processing resources such as automated speech recognition (ASR) engines 140, text-to-speech (TTS) synthesis engines 155, and various telephony platforms.

For example, as shown in FIG. 3, the dialog processing platform 120 includes a plurality of adapters 304 configured interface the ASR engines 140 and the TTS synthesis engines 155 to the DPP server 302. The adapters 304 allow the dialog processing platform 120 to interface with a variety of real-time speech processing engines, such as ASR engines 140 and TTS synthesis engines 155. The ASR engine adapter 135 and a TTS synthesis engine adapter 150 enable tenants to dynamically select speech recognition and text-to-speech synthesis providers or natural language speech processing resources that best suit the users objective, task, dialog, or query. In some implementations, the ASR engines 140 and the TTS synthesis engines 155 can be configured in a cloud-based architecture of the dialog processing platform 120 and may not be collocated in the same server device as the DPP server 302 or other components of the dialog processing platform 120.

The ASR engines 140 can include automated speech recognition engines configured to receive spoken or textual natural language inputs and to generate textual outputs corresponding the inputs. For example, the ASR engines 140 can process the user's verbalized query or utterance "When will my order be delivered?" into a text string of natural language units characterizing the query. The text string can be further processed to determine an appropriate query response. The dialog processing platform 120 can dynamically select a particular ASR engine 140 that best suits a particular task, dialog, or received user query.

The TTS synthesis engines 155 can include text-to-speech synthesis engines configured to convert textual responses to verbalized query responses. In this way, a response to a user's query can be determined as a text string and the text string can be provided to the TTS synthesis engines 155 to generate the query response as natural language speech. The dialog processing platform 120 can dynamically select a particular TTS synthesis engine 155 that best suits a particular task, dialog, or generated textual response.

As shown in FIG. 3, the dialog processing platform 120 includes a DPP server 302. The DPP server 302 can act as a frontend to the dialog processing platform 120 and can appropriately route data received from or to be transmitted to client devices 102 as appropriate. The DPP server 302 routes requests or data to specific components of the dialog processing platform 120 based on registered tenant and application identifiers which can be included in a profile associated with a particular tenant. The DPP server 302 can also securely stream to the ASR engines 140 and from the TTS synthesis engines 140.

As shown in FIG. 3, the dialog processing platform 120 includes a voiceXML (VXML) adapter 310 which can couple the DPP server 302 to various media resources 312. For example, the media resources 312 can include VoIP networks, ASR engines, and TTS synthesis engines 314. In some implementations, the media resources 312 enable the conversational agents to leverage existing telephony platforms, which can often be integrated with particular speech processing resources. The existing telephony platforms can provide interfaces for communications with VoIP infrastructures using session initiation protocol (SIP). In these configurations, VXML documents are exchanged during a voice call.

The dialog processing platform 120 also includes an orchestrator component 316. The orchestrator 316 provides an interface for administrators and tenants to access and configure the conversational system 300. The administrator portal 318 can enable monitoring and resource provisioning, as well as providing rule-based alert and notification generation. The tenant portal 320 can allow customers or tenants of the conversational system 300 to configure reporting and analytic data, such as account management, customized reports and graphical data analysis, trend aggregation and analysis, as well as drill-down data associated dialog utterances. The tenant portal 320 can also allow tenants to configure branding themes and implement a common look and feel for the tenant's conversational agent user interfaces. The tenant portal 320 can also provide an interface for onboarding or bootstrapping customer data. In some implementations, the tenant portal 320 can provide tenants with access to customizable conversational agent features such as user prompts, dialog content, colors, themes, usability or design attributes, icons, and default modalities, e.g., using voice or text as a first modality in a dialog. The tenant portal 320 can, in some implementations, provide tenants with customizable content via different ASR engines 140 and different TTS synthesis engines 155 which can be utilized to provide speech data in different voices and/or dialects. In some implementations, the tenant portal 320 can provide access to analytics reports and extract, transform, load (ETL) data feeds.

The orchestrator 316 can provide secure access to one or more backends of a tenants data infrastructure. The orchestrator 316 can provide one or more common APIs to various tenant data sources which can be associated with retail catalog data, user accounts, order status, order history, and the like. The common APIs can enable developers to reuse APIs from various client side implementations.

The orchestrator 316 can further provide an interface 322 to human resources, such as human customer support operators who may be located at one or more call centers. The dialog processing platform 120 can include a variety of call center connectors 324 configured to interface with data systems at one or more call centers.

The orchestrator 316 can also provide an interface 326 to configured to retrieve authentication information and propagate user authentication and/or credential information to one or more components of the system 300 to enable access to a user's account. For example, the authentication information can identify one or more users, such as individuals who have accessed a tenant web site as a customer or who have interacted with the conversational system 300 previously. The interface 326 can provide an authentication mechanism for tenants seeking to authenticate users of the conversational system 300. The dialog processing platform 120 can include a variety of end-user connectors 328 configured to interface the dialog processing platform 120 to one or more databases or data sources identifying end-users.

The orchestrator 316 can also provide an interface 330 to tenant catalog and e-commerce data sources. The interface 330 can enable access to the tenant's catalog data which can be accessed via one or more catalog or e-commerce connectors 332. The interface 330 enables access to tenant catalogs and/or catalog data and further enables the catalog data to be made available to the CTD modules 160. In this way, data from one or more sources of catalog data can be ingested into the CTD modules 160 to populate the modules with product or item names, descriptions, brands, images, colors, swatches, as well as structured and free-form item or product attributes. The interface 326 can also enable access to the tenant's customer order and billing data via one or more catalog or e-commerce connectors 328.

The dialog processing platform 120 also includes a maestro component 334. The maestro 334 enables administrators of the conversational system 300 to manage, deploy, and monitor conversational agent applications 106 independently. The maestro 334 provides infrastructure services to dynamically scale the number of instances of natural language resources, ASR engines 140, TTS synthesis engines 155, NLA ensembles 145, and CTD modules 160. The maestro 334 can dynamically scale these resources as dialog traffic increases. The maestro 334 can deploy new resources without interrupting the processing being performed by existing resources. The maestro 334 can also manage updates to the CTD modules 160 with respect to updates to the tenants e-commerce data and/or product catalogs. In this way, the maestro 334 provided the benefit of enabling the dialog processing platform 120 to operate as a highly scalable infrastructure for deploying artificially intelligent multi-modal conversational agent applications 106 for multiple tenants. As a result, the conversational system 300 can reduce the time, effort, and resources required to develop, test, and deploy conversational agents.

As shown in FIG. 3, the maestro 334 can interface with a plurality of natural language agent (NLA) ensembles 145. The NLA ensembles 145 can include a plurality of components configured to receive the text string from the ASR engines 140 and to process the text string in order to determine a textual response to the user query. The NLA ensembles 145 can include a natural language understanding (NLU) module implementing a number of classification algorithms trained in a machine learning process to classify the text string into a semantic interpretation. The processing can include classifying an intent of the text string and extracting information from the text string. The NLU module combines different classification algorithms and/or models to generate accurate and robust interpretation of the text string. The NLA ensembles 145 can also include a dialog manager (DM) module. The DM module can determine an appropriate dialog action in a contextual sequence formed by the current or previous dialog sequences conducted with the user. In this way, the DM can generate a response action to increase natural language quality and fulfillment of the user's query objective. The NLA ensembles 145 can also include a natural language generator (NLG) module. The NLG module can process the action response determined by the dialog manager and can convert the action response into a corresponding textual response. The NLG module provides multimodal support for generating textual responses for a variety of different output device modalities, such as voice outputs or visually displayed (e.g., textual) outputs.

Each of the NLA ensembles 145 can include one or more of a natural language generator (NLG) module 336, a dialog manager (DM) module 338, and a natural language understanding (NLU) module 340. In some implementations, the NLA ensembles 145 can include pre-built automations, which when executed at run-time, implement dialog policies for a particular dialog context. For example, the pre-built automations can include dialog policies associated with searching, frequently-asked-questions (FAQ), customer care or support, order tracking, and small talk or commonly occurring dialog sequences which may or may not be contextually relevant to the user's query. The NLA ensembles 145 can include reusable dialog policies, dialog state tracking mechanisms, domain and schema definitions. Customized NLA ensembles 145 can be added to the plurality of NLA ensembles 145 in a compositional manner as well.

As shown in FIG. 3, the NLA ensemble 145 includes a natural language understanding (NLU) module 336. The NLU module 336 can implement a variety of classification algorithms used to classify input text associated with a user query and generated by the ASR engines 140 into a semantic interpretation. In some implementations, the NLU module 336 can implement a stochastic intent classifier and a named-entity recognizer ensemble to perform intent classification and information extraction, such as extraction of entity or user data. The NLU module 336 can combine different classification algorithms and can select the classification algorithm most likely to provide the best semantic interpretation for a particular task or user query by determining dialog context and integrating dialog histories.

The classification algorithms included in the NLU module 336 can be trained in a supervised machine learning process using support vector machines or using conditional random field modeling methods. In some implementations, the classification algorithms included in the NLU module 336 can be trained using a convolutional neural network, a long short-term memory recurrent neural network, as well as a bidirectional long short-term memory recurrent neural network. The NLU module 336 can receive the user query and can determine surface features and feature engineering, distributional semantic attributes, and joint optimizations of intent classifications and entity determinations, as well as rule based domain knowledge in order to generate a semantic interpretation of the user query. In some implementations, the NLU module 336 can include one or more of intent classifiers (IC), named entity recognition (NER), and a model-selection component that can evaluate performance of various IC and NER components in order to select the configuration most likely generate contextually accurate conversational results. The NLU module 336 can include competing models which can predict the same labels but using different algorithms and domain models where each model produces different labels (customer care inquires, search queries, FAQ, etc.).

The NLA ensemble 145 also includes a dialog manager (DM) module 338. The DM module 338 can select a next action to take in a dialog with a user. The DM module 338 can provided automated learning from user dialog and interaction data. The DM module 338 can implement rules, frames, and stochastic-based policy optimization with dialog state tracking. The DM module 338 can maintain an understanding of dialog context with the user and can generate more natural interactions in a dialog by providing full context interpretation of a particular dialog with anaphora resolution and semantic slot dependencies. In new dialog scenarios, the DM module 338 can mitigate "cold-start" issues by implementing rule-based dialog management in combination with user simulation and reinforcement learning. In some implementations, sub-dialog and/or conversation automations can be reused in different domains.

The DM module 338 can receive semantic interpretations generated by the NLU module 336 and can generate a dialog response action using context interpreter, a dialog state tracker, a database of dialog history, and an ensemble of dialog action policies. The ensemble of dialog action policies can be refined and optimized using rules, frames and one or more machine learning techniques.

As further shown in FIG. 3, the NLA ensemble 145 includes a natural language generator (NLG) module 340. The NLG module 340 can generate a textual response based on the response action generated by the DM module 338. For example, the NLG module 340 can convert response actions into natural language and multi-modal responses that can be uttered or spoken to the user and/or can be provided as textual outputs for display to the user. The NLG module 340 can include a customizable template programming language which can be integrated with a dialog state at runtime.

In some implementations, the NLG module 340 can be configured with a flexible template interpreter with dialog content access. For example, the flexible template interpreter can be implemented using Jinja2, a web template engine. The NLG module 340 can receive a response action the DM module 338 and can process the response action with dialog state information and using the template interpreter to generate output formats in speech synthesis markup language (SSML), VXML, as well as one or more media widgets. The NLG module 340 can further receive dialog prompt templates and multi-modal directives. In some implementations, the NLG module 340 can maintain or receive access to the current dialog state, a dialog history, and can refer to variables or language elements previously referred to in a dialog. For example, a user may have previously provided the utterance "I am looking for a pair of shoes for my wife". The NLG module 340 can label a portion of the dialog as PERSON_TYPE and can associate a normalized GENDER slot value as FEMALE. The NLG module 340 can inspect the gender reference and customize the output by using the proper gender pronouns such as 'her, she, etc.'

The dialog processing platform 120 also includes catalog-to-dialog (CTD) modules 160. The CTD modules 160 can be selected for use based on a profile associated with the tenant or entity. The CTD modules 160 can automatically convert data from a tenant or entity catalog, as well as billing and order information into a data structure corresponding to a particular tenant or entity for which the conversational system 300 is deployed. The CTD modules 160 can derive product synonyms, attributes, and natural language queries from product titles and descriptions which can be found in the tenant or entity catalog. The CTD modules 160 can generate a data structure that is used the machine learning platform 165 to train one or more classification algorithms included in NLU module. In some implementations, the CTD modules 160 can be used to efficiently pre-configure the conversational system 300 to automatically respond to queries about orders and/or products or services provided by the tenant or entity. For example, the dialog processing platform 120 can process the users query to determine a response regarding the previously placed order. As a result of the processing, the dialog processing platform 120 can generate a response to the user's query. The query response can be transmitted to the client device 102 and provided as speech output via an output device and/or provided as text displayed via display 112.

The CTD module 160 can implement methods to collect e-commerce data from tenant catalogs, product reviews, and user clickstream data collected at the tenants web site to generate a data structure that can be used to learn specific domain knowledge and to onboard or bootstrap a newly configured conversational system 300. The CTD module 160 can extract taxonomy labels associated with hierarchical relationships between categories of products and can associate the taxonomy labels with the products in the tenant catalog. The CTD module 160 can also extract structured product attributes (e.g., categories, colors, sizes, prices) and unstructured product attributes (e.g., fit details, product care instructions) and the corresponding values of those attributes. The CTD module 160 can normalize attribute vales so that the attribute values share the same format throughout the catalog data structure. In this way, noisy values caused by poorly formatted content can be removed.

Products in an e-commerce catalogs can be typically organized in a multi-level taxonomy, which can group the products into specific categories. The categories can be broader at higher levels (e.g., there are more products) and narrower (e.g., there are less products) at lower levels of the product taxonomy. For example, a product taxonomy associated with clothing can be represented as Clothing>Sweaters>Cardigans & Jackets. The category "Clothing" is quite general, while "Cardigans & Jackets" are a very specific type of clothing. A user's queries can refer to a category (e.g., dresses, pants, skirts, etc.) identified by a taxonomy label or to a specific product item (e.g., item #30018, Boyfriend Cardigan, etc.). In a web-based search session, a product search could either start from a generic category and narrow down to a specific product or vice versa. CTD module 160 can extract category labels from the catalog taxonomy, product attributes types and values, as well as product titles and descriptions.

The CTD module 160 can automatically generate attribute type synonyms and lexical variations for each attribute type from search query logs, product descriptions and product reviews and can automatically extract referring expressions from the tenant product catalog or the user clickstream data. The CTD module 160 can also automatically generate dialogs based on the tenant catalog and the lexicon of natural language units or words that are associated with the tenant and included in the data structure.

The CTD module 160 utilizes the extracted data to train classification algorithms to automatically categorize catalog categories and product attributes when provided in a natural language query by a user. The extracted data can also be used to train a full search engine based on the extracted catalog information. The full search engine can thus include indexes for each product category and attribute. The extracted data can also be used to automatically define a dialog frame structure that will be used by a dialog manger module, described later, to maintain a contextual state of the dialog with the user.

The conversational system 300 includes a machine learning platform 165. Machine learning can refer to an application of artificial intelligence that automates the development of an analytical model by using algorithms that iteratively learn patterns from data without explicit indication of the data patterns. Machine learning can be used in pattern recognition, computer vision, email filtering and optical character recognition and enables the construction of algorithms or models that can accurately learn from data to predict outputs thereby making data-driven predictions or decisions.

The machine learning platform 165 can include a number of components configured to generate one or more trained prediction models suitable for use in the conversational system described in relation to FIG. 1. For example, during a machine learning process, a feature selector can provide a selected subset of features to a model trainer as inputs to a machine learning algorithm to generate one or more training models. A wide variety of machine learning algorithms can be selected for use including algorithms such as support vector regression, ordinary least squares regression (OLSR), linear regression, logistic regression, stepwise regression, multivariate adaptive regression splines (MARS), locally estimated scatterplot smoothing (LOESS), ordinal regression, Poisson regression, fast forest quantile regression, Bayesian linear regression, neural network regression, decision forest regression, boosted decision tree regression, artificial neural networks (ANN), Bayesian statistics, case-based reasoning, Gaussian process regression, inductive logic programming, learning automata, learning vector quantization, informal fuzzy networks, conditional random fields, genetic algorithms (GA), Information Theory, support vector machine (SVM), Averaged One-Dependence Estimators (AODE), Group method of data handling (GMDH), instance-based learning, lazy learning, and Maximum Information Spanning Trees (MIST).

The CTD modules 160 can be used in the machine learning process to train the classification algorithms included in the NLU of the NLA ensembles 145. The model trainer can evaluate the machine learning algorithm's prediction performance based on patterns in the received subset of features processed as training inputs and generates one or more new training models. For example, the model trainer can be configured to generate a training model, such as model 210, that can receive item names and generate predicted referring expressions as a result of training the model using clickstream, click path, and web log data. The generated training models, e.g., classification algorithms and models included in the NLU of the NLA ensemble 145, can then be incorporated into predictive models capable of receiving user search queries including text strings of referring expressions and to output predicted item names including at least one item name from a lexicon associated with the tenant or entity for which the conversational system 300 has been configured and deployed.

Exemplary technical effects of the methods, systems, and computer-readable medium described herein include, by way of non-limiting example, training a model to generate referring expressions of items or item for use in a conversation system. The trained model can be used in a conversational system to receive the referring expressions as query inputs to a search engine and to generate item names which are syntactically equivalent to the referring expression. The conversational system can provide improved interfaces for processing user queries composed of referring expressions using distributed natural language resources. The conversational system can improve the contextual accuracy of conversational agent dialogs using a clickstream, click path, and web log data in a machine learning process in order to train classification algorithms to process the user query and generate items names. The conversational system also provides improved bootstrapping and preconfiguration of conversational systems without requiring significant amounts of training data prior to system deployment. Thus the conversational systems and interfaces described herein improve the operation of computing devices configured as conversational agents and conversational systems.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment can be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, can be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language can correspond to the precision of an instrument for measuring the value. Here and throughout the specification and claims, range limitations can be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A method comprising:
receiving data characterizing historical user interaction with a search engine associated with a plurality of items, the received data including a first search query and a first item name selected by a user in response to receiving a result of a search of the first search query;
training, using the received data, a model that predicts referring expressions from item names, the model including a predictive model, the training including using the first item name selected by the user as an input to the model and the first search query as a supervisory signal to the model;
providing the model for use by a conversational system, the conversational system capable of exchanging information with a second user in a series of steps forming a dialog between the conversational system and the second user, the dialog including the conversational system receiving an input referring expression from a second user and as part of a second search query to the conversational system and the conversational system providing a query result including the first item name for the second user; and determining, using the model, a set of semantically equivalent expressions for the first item name.

2. The method of claim 1, wherein data characterizing historical user interaction includes clickstream data, click path data, and/or web log data.

3. The method of claim 1, wherein the received data further characterizes item descriptions, reviews, and/or purchase history.

4. The method of claim 1, further comprising adding the set of semantically equivalent expressions to a lexicon associated with a first tenant and used by a dialog manager.

5. The method of claim 1, wherein the referring expressions include item synonyms, colloquial expressions, and/or generic descriptions corresponding to the first item name.

6. The method of claim 1, wherein the data characterizing historical user interaction characterizes a relevancy between search queries and item names.

7. The method of claim 1, wherein the model includes a neural language model; a recurrent neural network (RNN) including an encoder and a decoder; a feed-forward neural network based language model; and/or a recurrent neural network based language model.

8. The method of claim 1, wherein the providing includes using the model to determine, from the input referring expression provided as part of the second search query, the first item name.

9. The method of claim 1, wherein the providing includes storing, displaying, processing, and/or transmitting the model.

10. The method of claim 1, wherein the conversational system includes multiple tenants, each tenant providing a respective dialog to respective users, the conversational system enabling each tenant to dynamically select speech recognition providers, text-to-speech synthesis providers, and/or natural language speech processing resources.

11. A system comprising:
at least one data processor; and
memory storing instructions, which when executed by at the least one data processor causes the at least one data processor to perform operations comprising:
receiving data characterizing historical user interaction with a search engine associated with a plurality of items, the received data including a first search query and a first item name selected by a user in response to receiving a result of a search of the first search query;
training, using the received data, a model that predicts referring expressions from item names, the model including a predictive model, the training including using the first item name selected by the user as an input to the model and the first search query as a supervisory signal to the model;
providing the model for use by a conversational system, the conversational system capable of exchanging information with a second user in a series of steps forming a dialog between the conversational system and the second user, the dialog including the conversational system receiving an input referring expression from a second user and as part of a second search query to the conversational system and the conversational system providing a query result including the first item name for the second user; and
determining, using the model, a set of semantically equivalent expressions for the first item name.

12. The system of claim 11, wherein data characterizing historical user interaction includes clickstream data, click path data, and/or web log data.

13. The system of claim 11, wherein the received data further characterizes item descriptions, reviews, and/or purchase history.

14. The system of claim 11, the operations further comprising adding the set of semantically equivalent expressions to a lexicon associated with a first tenant and used by a dialog manager.

15. The system of claim 11, wherein the referring expressions include item synonyms, colloquial expressions, and/or generic descriptions corresponding to the first item name.

16. The system of claim 11, wherein the data characterizing historical user interaction characterizes a relevancy between search queries and item names.

17. A non-transitory computer readable medium storing instructions, which when executed by at least one data processor cause the at least one data processor to perform operations comprising:
receiving data characterizing historical user interaction with a search engine associated with a plurality of items, the received data including a first search query and a first item name selected by a user in response to receiving a result of a search of the first search query;
training, using the received data, a model that predicts referring expressions from item names, the model including a predictive model, the training including using the first item name selected by the user as an input to the model and the first search query as a supervisory signal to the model;
providing the model for use by a conversational system, the conversational system capable of exchanging information with a second user in a series of steps forming a dialog between the conversational system and the second user, the dialog including the conversational system receiving an input referring expression from a second user and as part of a second search query to the conversational system and the conversational system providing a query result including the first item name for the second user; and
determining, using the model, a set of semantically equivalent expressions for the first item name.

* * * * *